United States Patent [19]

Ishii et al.

[11] Patent Number: 5,130,730
[45] Date of Patent: * Jul. 14, 1992

[54] BARRIER MECHANISM OF CAMERA

[75] Inventors: Haruo Ishii; Shinsuke Kohmoto; Hiroshi Nomura, all of Tokyo, Japan

[73] Assignee: Asahi Kogaku Kogyo Kaisha, Tokyo, Japan

[*] Notice: The portion of the term of this patent subsequent to Jan. 29, 2008 has been disclaimed.

[21] Appl. No.: 556,376

[22] Filed: Jul. 23, 1990

Related U.S. Application Data

[63] Continuation of Ser. No. 318,336, Mar. 3, 1989, Pat. No. 4,989,027.

[30] Foreign Application Priority Data

Mar. 4, 1988 [JP] Japan .................................. 63-28981
Mar. 9, 1988 [JP] Japan .................................. 63-31043
Mar. 9, 1988 [JP] Japan .................................. 63-31044

[51] Int. Cl.$^5$ .................................. G03B 9/26
[52] U.S. Cl. .................................. 354/253; 354/266
[58] Field of Search ................. 354/236, 250, 253, 266

[56] References Cited

U.S. PATENT DOCUMENTS 4,944,030 7/1990 Haraguchi et al. ............... 354/403
4,989,027 1/1991 Ishii et al. ........................ 354/253

FOREIGN PATENT DOCUMENTS 62-193228 12/1987 Japan .
62-193229 12/1987 Japan .

Primary Examiner—L. T. Hix
Assistant Examiner—J. K. Han
Attorney, Agent, or Firm—Sandler, Greenblum & Bernstein

[57] ABSTRACT

A barrier mechanism of a camera includes a cylindrical lens cover which has an aperture at its front face and which is supported to move between a photographing position and an accommodating position to the rear of the photographing position. At least one barrier is provided on the front end of the lens cover to open and close the aperture. A barrier opening and closing mechanism which opens and closes the barrier in association with the rotation of a cam ring is further provided. The barrier opening and closing mechanism includes a spring for biasing the barrier towards an open position, and an opening and closing pin which can be moved radially with respect to the lens cover. The pin closes the barrier when moved in the radial direction, and a closing lever is located at a predetermined position outside the lens cover and is biased to rotate to continuously press the opening and closing pin to close the barrier. The cam ring is located to normally prevent contact between the closing lever and the opening and closing pin. The cam ring is provided with an opening which permits the closing lever to rotate toward the opening and closing pin when the lens cover is moved to the accommodating position.

5 Claims, 7 Drawing Sheets

BARRIER MECHANISM OF CAMERA

This is a continuation of application Ser. No. 07/318,336, filed Mar. 3, 1989, now U.S. Pat. No. 4,989,027.

BACKGROUND OF THE INVENTION

1. Field of the Invention

The present invention relates to a barrier mechanism which opens and closes an aperture located in front of a photographing lens in a camera.

2. Description of the Related Art

In place of a conventional removable lens cap which protects a photographing lens of a camera, a lens cap (barrier) which is provided in a camera body is used particularly in a lens shutter type of camera. There are various known barrier mechanisms, in which barriers are located in front of the photographing lens, independently of the same in function. The barriers are biased into an open position or closed position by springs or the like. A photographer operates the barrier to open or close the same against the spring force. However, such a manual operation is not desirable particularly in an automatic lens shutter type of camera in which almost all of the operations are automated.

Under these circumstances, the assignee of the present application has proposed a barrier mechanism of a camera in which a cylindrical lens cover having at its front end an aperture is linearly movably supported between a photographing position and an accommodating position located in rear of the photographing position. This is disclosed in Japanese Unexamined Utility Model Publication Nos. 62-193228 and 62-193229 (U.S. Ser. No. 144,030). The lens cover is provided, on its outer periphery, with a cam ring which moves the lens cover between the photographing position and the accommodating position in accordance with the rotation thereof. The lens cover has at its front end a pair of barriers for opening and closing the aperture and a barrier opening and closing mechanism which opens and closes the barriers in association with the rotation of the cam ring.

In these above-mentioned barrier mechanisms an opening and closing pin which is biased into a barrier opening position is displaced by a projection provided on the cam ring toward a barrier closing position. It has been found that the opening and closing pin can not be displaced by a predetermined stroke sufficient to close the barriers due to a manufacturing error or an assembly error, of the elements, thus resulting in a failure of a complete closure of the barriers.

Furthermore, in these barrier mechanisms, since the barriers, which are biased to be opened by spring means, are closed against the spring means, the largest reaction of the spring means is produced at the closed position of the barriers. Accordingly, when the cam ring is in its lens accommodating position, it is necessary to apply a large operational force to the barrier opening and closing member in order to bias the barriers into the closed position. If the operational force is decreased for some reason, the barriers can not be completely closed. In particular, the barriers are biased in a closed position by a spring means. However, when the barriers are closed the reaction of the spring means which tends to open the barriers is largest whereas the spring force which biases the closed position is at its smallest value. Thus, it is difficult to set a proper spring balance, and an impractical large spring may be needed.

In addition, there is a possibility that when the barriers are closed, they are not equally displaced, so that one of the barriers is maintained to be slightly opened. This is because, according to the inventors' analysis, the force necessary to close the barriers is not equal for each of the barriers, whereas the opening and closing member tends to move to equally close each of the barriers. Therefore, one of the barriers (heavier barrier) reaches and passes a correct closed position prior to the remaining barrier (lighter barrier), thus resulting in an excess displacement of the heavier barrier. Even if the lighter barrier comes into contact with the heavier barrier, it is impossible to bring the heavier barrier back to the correct closed position, resulting in an incomplete closure of the barriers.

SUMMARY OF THE INVENTION

The primary object of the present invention is to provide a barrier mechanism which is free from the drawbacks mentioned above and which can certainly close the barriers even if there is a manufacturing or assembly error of the elements.

Another object of the present invention is to provide a barrier mechanism in which a pair of barriers continuously biased to be opened are closed against a biasing force in a lens accommodating position. An operational force to be applied to the barrier opening and closing member to close the barriers is substantially constant, or even if the operational force is increased in accordance with the reaction of the spring, the increase is small.

Still another object of the present invention is to provide a barrier mechanism in which a pair of barriers can be closed at a correct closed position.

As mentioned before, the inventors have conceived that an incomplete closure of the barriers occurs because of insufficient displacement (stroke) of the opening and closing pin which is continuously biased to open the barriers. Accordingly, the solution is directed to guaranteeing a sufficient displacement of the opening and closing pin in any state.

Namely, according to the present invention, there is provided a barrier mechanism of a camera comprising a cylindrical lens cover which has at its front face an aperture and which is supported to move between a photographing position and an accomodating position being the accommodating position in rear of the photographing position. The lens cover is provided with a cam ring which moves the lens cover between the photographing position and the accommodating position in accordance with the rotation thereof. At least one barrier is further provided on the front end of the lens cover to open and close the aperture, and a barrier opening and closing mechanism is provided which opens and closes the barrier in association with the rotation of the cam ring. The barrier opening and closing mechanism comprises spring means for biasing the barrier towards an open position, and an opening and closing pin which can be moved in the radial directions of the lens cover. The opening and closing pin closes the barrier against the spring means when the opening and closing pin moves in one radial direction. A closing lever is located at a predetermined position outside the lens cover, and is biased to rotate to continuously press the opening and closing pin toward a particular radial direction (that is, toward its closing position). The cam ring is provided in a location to normally prevent contact between the closing lever and the opening and closing pin, and the cam ring is further provided with an opening which permits the closing lever to rotate toward the opening and closing pin when the lens cover is moved to the accommodating position.

With this arrangement, when the opening of the cam ring is registered with the closing lever, that is, when the cylindrical lens cover is moved backward to the accommodating position, the closing and opening pin can be fully pushed (displaced) by the rotational biasing force of the closing lever, so that no failure of complete closure of the barriers occurs.

The present invention also proposes a barrier mechanism that compensates for an increase of spring reaction which is produced when the barriers are closed, by increasing arm length of the barrier closing member, so that the barriers can be closed with a small force. Namely, if the reaction of the spring increases, the arm length of the lever for rotating the barriers against the spring force is correspondingly increased. With this arrangement, the operational force to be applied to the lever can be maintained substantially constant or at least, the operational force does not increase in proportion to the reaction of the spring.

Furthermore, the present invention proposes a mechanism in which, when a pair of barriers are closed, a lighter barrier is first brought into the closed position or into an excess closed position beyond the closed position, and the heavier barrier is then moved to the closed position. With this arrangement, since the lighter barrier is brought back to the correct closed position by the heavier barrier, both the barriers can be always closed at the correct closed position.

BRIEF DESCRIPTION OF THE DRAWINGS

The present invention will be described below in detail with reference to the accompanying drawings in which.

DETAILED DESCRIPTION OF THE PREFERRED EMBODIMENTS

The illustrated embodiments are directed to a lens shutter camera having a zoom lens.

Figure 6:
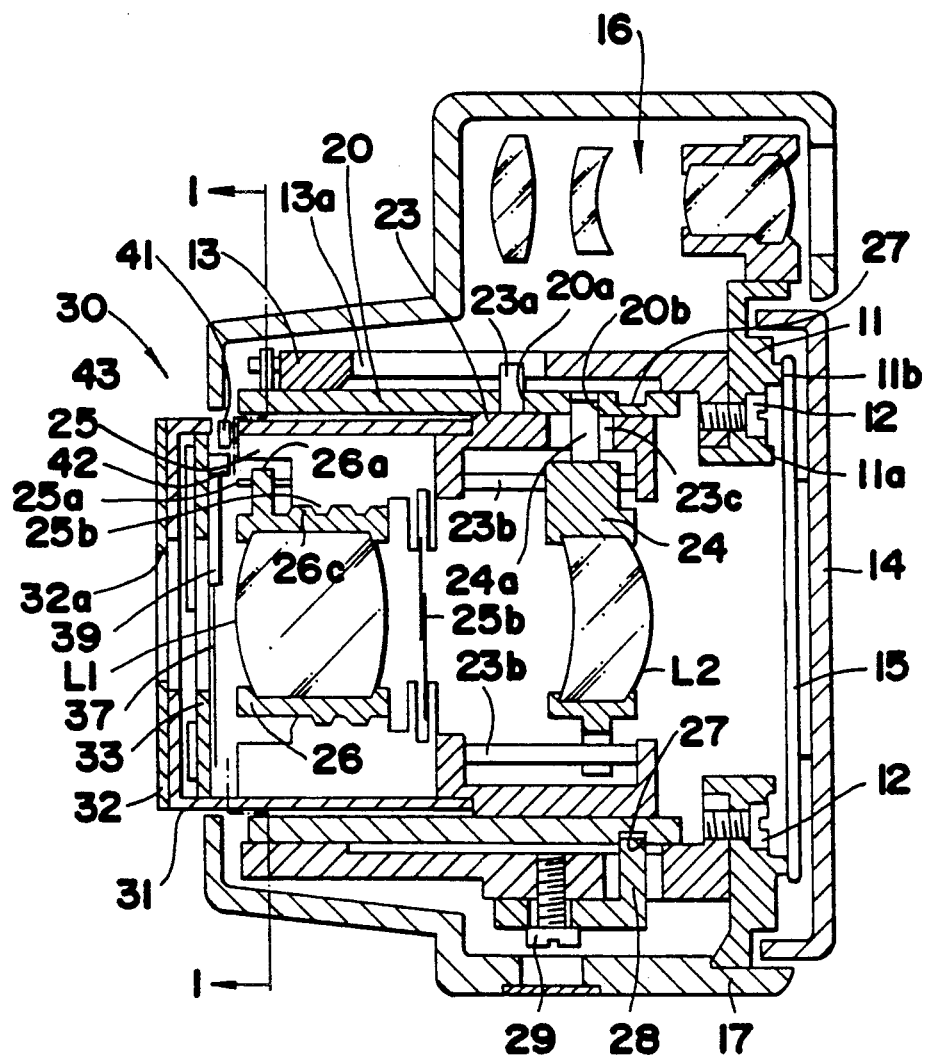
FIG. 6 is a longitudinal sectional view of a lens shutter type of camera having a barrier mechanism according to the present invention.

FIG. 6 shows a whole construction of a zoom lens shutter camera having a barrier mechanism 30 according to the present invention. A camera body 11 has a stationary barrel 13 which is secured to the front face thereof by set screws 12. On the rear face of the body 11 are provided an inner rail 11a and an outer rail 11b which comes into contact with a pressure plate 15 provided on a back cover 14, so that a film moves in a space defined between the pressure plate 15 and the inner rail 11a. A finder optical system 16 is provided above the body 11. The body 11, the finder optical system 16 and the stationary barrel 13 are covered by a camera body case 17.

A cam ring 20 is fitted onto the inner periphery of the stationary barrel 13 so as to rotate and move in the optical axis directions. The cam ring 20 has cam grooves 20a and 20b for moving front and rear lens groups L1 and L2 in the optical axis directions along predetermined tracks defined by the profiles of the cam grooves. A pin 23a provided on a cam follower ring 23 for the front lens group is fitted in the cam groove 20a. The pin 23a is also fitted in a linear movement guide groove 13a which is formed in the stationary barrel 13 to extend in the optical axis direction, so that the cam follower ring 23 can move only in the optical axis directions but can not rotate.

The cam follower ring 23 for the front lens group is provided with a guide pin 23b which extends in parallel with the optical axis to slidably support a cam follower ring 24 which supports the rear lens group L2. A pin 24a provided on the cam follower ring 24 is fitted in the cam groove 20b of the cam ring 20 through a groove 23c formed in the cam follower ring 23.

The cam follower ring 23 for the front lens group has a lens shutter unit 25 secured to the front portion thereof. The lens shutter unit 25 is screw-engaged by a lens ring 26 which supports the front lens group L1 through helicoids 25b and 26c. The lens shutter unit 25 rotates the drive pin 25a provided thereon by an angular displacement corresponding to a distance signal from an object distance measuring device (not shown) and opens and closes a shutter sector 25b in accordance with a measuring light signal from a photometer (not shown). The drive pin 25a is engaged by an association arm 26a secured to the front lens ring 26, so that the front lens ring 26 moves in the optical axis directions in accordance with the angular displacement of the drive pin 25a to adjust the focus.

The cam ring 20 is driven to rotate by a drive motor (not shown) through a gear train. When the cam ring 20 rotates, the front cam follower ring 23, and accordingly, the front lens group L1 move in the optical axis directions in accordance with the profiles of the cam groove 20a and the linear movement guide groove 13a. In addition, the rear cam follower ring 24, and accordingly, the rear lens group L2 move in the optical axis directions in accordance with the profile of the cam groove 20b to change the spatial distance between the front and rear lens groups L1 and L2, thus effecting zooming. When the cam ring 20 rotates to one of the extremities of the angular displacement, the lens groups L1 and L2 are moved to the accommodating position which is retracted from the photographing position.

A back adjustment mechanism is provided between the cam ring 20 and the stationary barrel 13. The cam ring 20 is provided on its outer periphery with a circumferential groove 27 in which a thrust member 28 supported on the stationary barrel 13 for the axial movement is fitted. Thus, the back adjustment in which the position of the cam ring 20, and accordingly, the positions of the front and rear lens groups L1 and L2 are adjusted to make the focal plane coincidental with the film plane can be effected by the adjustment of the axial position of the thrust member 28. After the back adjustment is effected, the thrust member 28 is secured to the stationary barrel 13 by the set screws 29.

A cylindrical lens cover is secured to the cam follower ring 23. The cylindrical lens cover 31 has at its front face an aperture frame 32 having an aperture 32a secured thereto. A barrier ring plate 33 is secured to the inner periphery of the lens cover 31. The barrier mechanism 30, which constitutes one of the most significant features of the present invention, is supported by the front and rear faces of the barrier ring plate 33.

Figure 1:
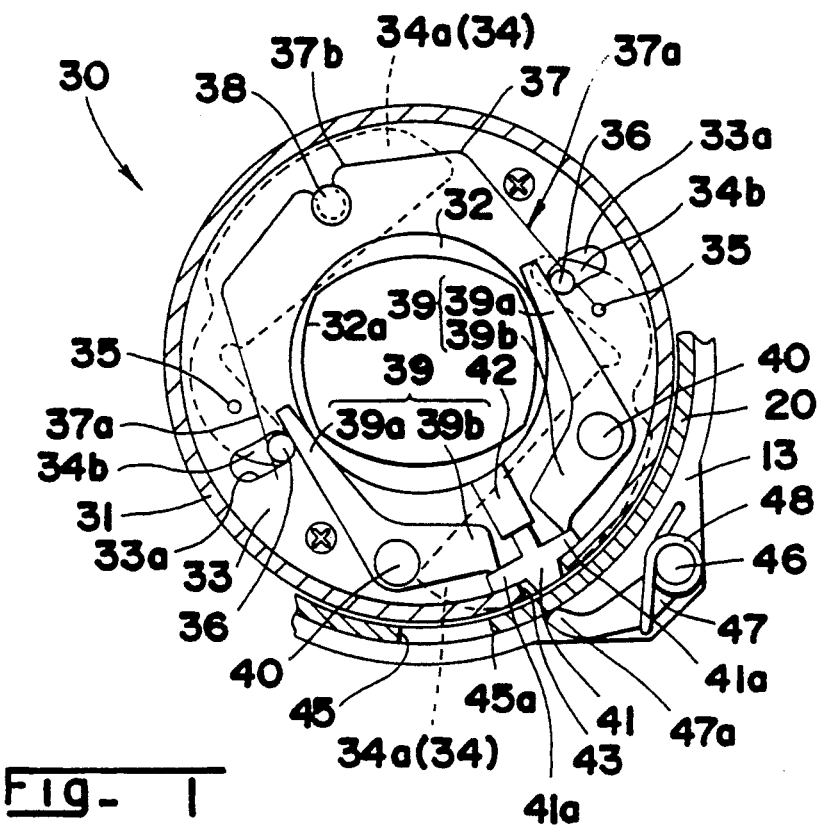
FIGS. 1 and 2 are sectional views, taken along the line I—I in FIG. 6, showing a barrier mechanism of a camera according to an embodiment of the present invention, depicting open and closed positions of the barriers, respectively.
Figure 2:
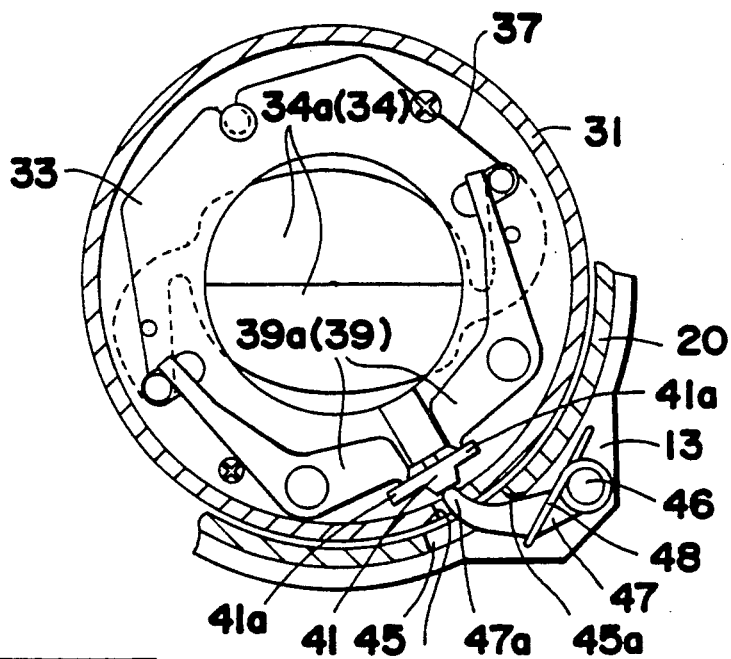

FIGS. 1 and 2 show an embodiment of the barrier mechanism 30. FIGS. 1 and 2 are sectional views taken along the line I—I in FIG. 6, viewed from rear. The barrier ring plate 33 has a pair of barriers 34 which are pivoted to the front face of the barrier ring by pins 35 to open and close the aperture 32a. The barriers 34 are opposed to each other in a symmetrical arrangement and have barrier plate portions 34a which project into the aperture 32a and are driven by arm portins 34b which extend substantially perpendicularly to the associated barrier plate portions 34b with respect to the pins 35.

The driven arm portions 34b have operation pins 36 which extend through holes 33a to project to the back face of the barrier ring plate 33. The operation pins 36 are engaged at their outside outer peripheries by a pair of elastic leg portions 37a of a single wire spring 37 to bias the barriers 34 in a direction in which the barrier plate portions 34a open the aperture 32a. Accordingly, when no external force is applied to the barriers 34, the latter always open the aperture 32a.

The wire spring 37, which is made of metal, has a U-shaped central portion 37b which engages with a support pin 38 provided on the barrier ring plate 33. A change in spring force due to a change of environment, such as temperature or humidity, does not occur, nor does deterioration due to aging occur. Thus, the wire spring 37 can continuously bias the barriers 34 in an open position with a stable constant spring force.

The operation pins 36 of the driven arm portions 34b are engaged at their inside outer peripheries by respective operational arms 39a of a pair of right and left intermediate arms 39 which are pivoted to the barrier ring 33 by respective pins 40. The intermediate arms 39 have a pair of driven arms 39b which extend in opposite directions to the respective operational arms 39a with respect to the associated pins 40 to come into engagement with opposite drive arms 41a of an opening and closing pin 41. The opening and closing pin 41 is movably guided by a guide cylinder 42 which is to the barrier ring 33 in position extending radially from the center of the barrier ring 33. The head of the opening and closing pin 41 faces an association rectangular hole 43 formed in the lens cover 31. The opening and closing pin 41 is located in an outermost position in which the pin 41 is outwardly and radially projected by the spring force of the wire spring 37 when no external force is applied to the pin 41. The wire spring 37 and the intermediate arms 39 are provided on the back surface of the barrier ring 33.

The rotating cam ring 20 which surrounds the outer periphery of the cylindrical lens cover 31 is provided on its front end surface with an opening (recess) 45 which is registered with the rectangular hole 43 when the lens cover 31 comes to the accommodationg position. The stationary barrel 13 has a closing lever 47 pivoted thereto by a shaft 46. The closing lever 47 is biased by a torsion spring 48 provided on the shaft 46, so that the operational end 47a of the closing lever 47 extends through the rectangular hole 43 into the inside of the lens cover 31 to push the opening and closing pin 41. Since the opening 45 is provided in the cam ring 20 which rotates around the lens cover 31, the operational end 47a of the closing lever 47 extends through the opening 45 into the rectangular hole 43 only when the operational end 47a is registered with the opening 45. Otherwise, the operational end 47a of the closing lever 47 is maintained so as not to enter the rectangular hole 43 by the outer surface of the cam ring 20. The operational end 47a of the closing lever 47 is registered with the opening 45 only when the cylindrical lens cover 31 rotates to the accommodating position.

In the barrier mechanism 30 as mentioned above, the operational end 47a of the closing lever 47 extends through the opening 45 and the rectangular hole 43 which is registered therewith to press the opening and closing pin 41 with the help of the spring force of the torsion spring 48. This occurs when the lens groups L1 and L2 are located in the accommodating position through the cam grooves 20a and 20b of the cam ring 20. As a result, the right and left drive arms 41a of the opening and closing pin 41 push the driven arms 39b of the intermediate arms 39 to rotate the same against the spring force of the wire spring 37. Consequently, the barriers 34 rotate about the associated pins 35 to close the barrier plate portions 34a (FIG. 2). The force for closing the barriers is obtained by the spring force of the torsion spring 48 which is set to fully overcome the spring force of the wire spring 37. Accordingly, it is possible to cause a displacement (stroke) of the opening and closing pin 41 sufficient to close the barrier plate portions 34a, thus resulting in no failure of closure of the barrier plate portions 34a.

On the other hand, when the cam ring 20 is rotated to a photographing position in which a picture can be taken from the extremity corresponding to the lens accommodating position, the end 45a of the opening 45 moves (raises) the closing lever 47 outwardly and radially against the torsion spring 48, so that the operational end 47a comes into slide contact with the outer peripheral surface of the cam ring 20. In this state, since no barrier closing force is applied to the opening and closing pin 41, the barriers 34 are opened by the wire spring 37 (FIG. 1).

After photographing is completed, the cam ring 20 is rotated to the lens accommodating position, and the operational end 47a of the closing lever 47 enters the opening 45 to occupy a position shown in FIG. 2. Namely, the barriers 34 are automatically closed again.

Figure 3:
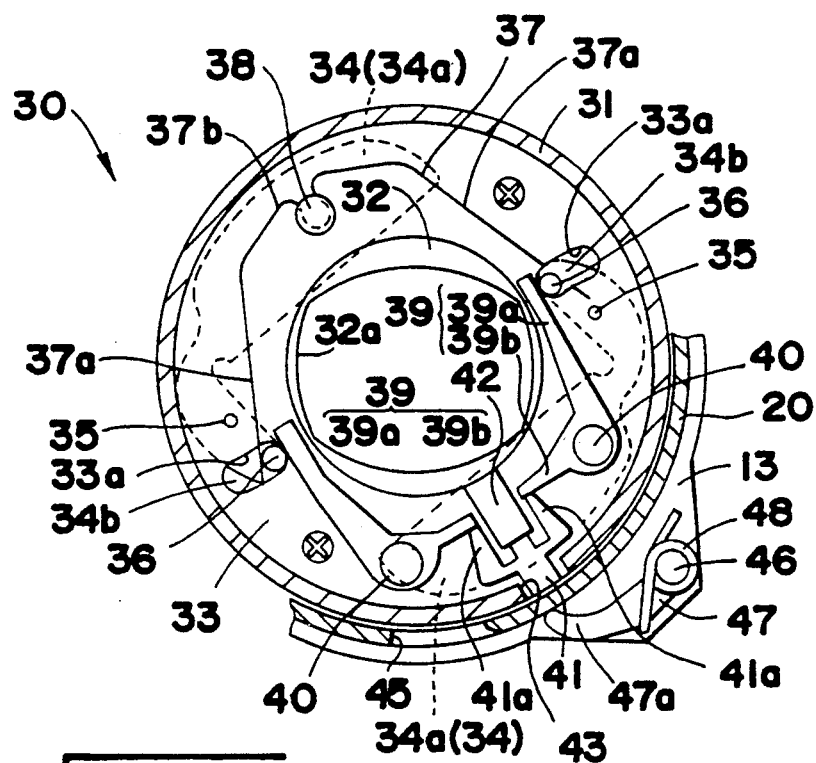
FIGS. 3 and 4 are sectional views similar to FIGS. 1 and 2, according to another embodiment of the present invention, respectively.
Figure 4:
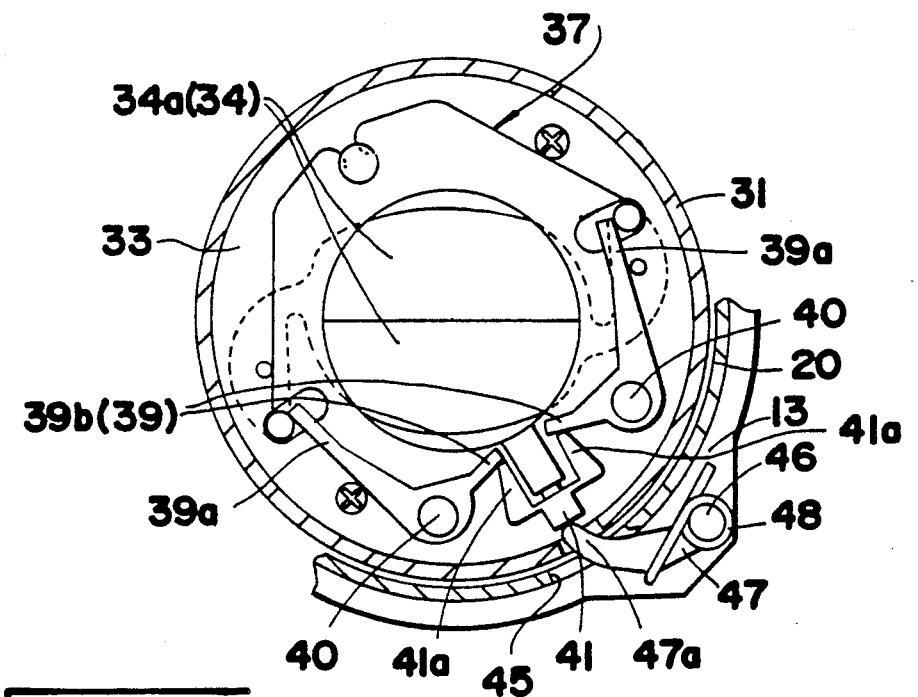
Figure 5:
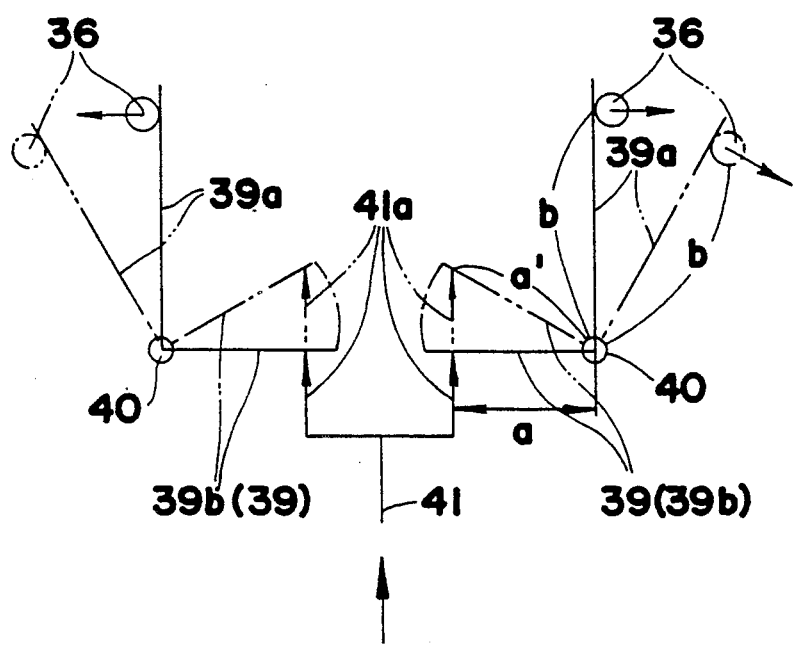
FIG. 5 is a skeleton diagram showing a relationship between an opening and closing pin and intermediate levers in an embodiment illustrated in FIGS. 3 and 4.

FIGS. 3 and 4 show another embodiment of the present invention. The differences between the first embodiment illustrated in FIGS. 1 and 2 and the second embodiment illustrated in FIGS. 3 and 4 reside in the shapes of the drive arms 41a of the opening and closing pin 41, and the driven arms 39b of the intermediate arms 39 which bear against the drive arms 41a. Namely, in the second embodiment, the drive arms 41a extend in the radial directions of the cam ring 20 and have sharp front ends. On the other hand, the driven arms 39b of the intermediate arms 39 are shaped so that when the barriers 34 are in an open position, the driven arms 39b come into contact with the associated drive arms 41a substantially at a right angle. FIG. 5 shows a skeleton diagram showing a relationship between the opening and closing pin 41 and the intermediate levers (arms) 39.

The operation for opening and closing the barriers 34 in the second embodiment is substantially same as that of the first embodiment. It should be, however, appreciated that when the opening and closing pin 41 is displaced by the closing lever 47, the contact point (a point at which the force acts) between the drive arms 41a and the associated drive arms 39b moves outward away from the pins 40, so that the arm length of the driven arms 39b is substantially increased (FIG. 4). Therefore, if the opening and closing pin 41 is pressed and displaced with the same force, the force which tends to close the barriers 34 through the intermediate arms 39 increases as the opening and closing pin 41 moves inward. As a result, the increased force compensates for the reaction of the wire spring 37 which increases as the barriers 34 are closed. Therefore, with this arrangement, the operational force of the opening and closing pin 41 does not substantially change. This makes it possible to use a stronger wire spring 37 or a weaker torsion spring 48.

This will be explained below in more detail with reference to FIG. 5.

Suppose that the opening and closing pin 41 which is pressed by the closing lever 47 is moved from a position shown at a solid line to a position shown at an imaginary line in the course of closure of the barriers. The effective length of the driven arms 39b of the intermediate levers 39 is increased from a to a'. On the contrary, the effective arm length of the operational arms 39a (the distance between the pins 40 and the associated operational pins 36) is substantially maintained constant as b. Thus, the operational force F to be applied to the opening and closing pin 41 can be maintained constant or any increase of the operational force F if necessary is remarkably reduced, in spite of the increased reaction of the wire spring 37. As the opening and closing pin 41 is pressed and displaced with the same force F, the force which tends to open the barriers 34 through the intermediate levers 39 increases as the opening and closing pin 41 moves inward to correspond to the reaction of the wire spring 37 which increases as the opening angular displacement of the barriers 34 increases. Thus, a barrier opening and closing mechanism in which no change or only slight change of the operational force of the opening and closing pin 41 takes place can be realized.

It can be easily understood that even if the arm length b of the intermediate levers 39 mentioned above increases as the barriers are closed, the philosophy of the present invention can be applied so long as the arm length a has a larger change (i.e. a relationship in which the ratio a/b increases).

FIGS. 7 through 10 show still another embodiment of the present invention. In the third embodiment illustrated in FIGS. 7-10, the improvement is addressed to the prevention of incomplete closure of the barriers 34, wherein the barriers 34 are brought into contact with each other at a correct closed position. The feature of the third embodiment is a provision of an inclinable plate 41A which constitutes drive arms 41a' of the opening and closing pin 41 and which is made of a material separate from the opening and closing pin 41.

Figure 9:
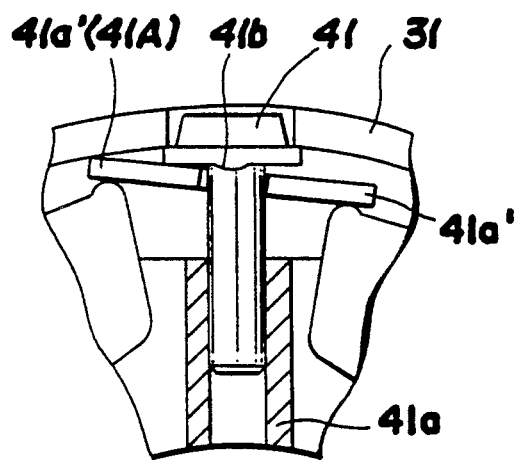
FIGS. 9 and 10 are enlarged sectional view and perspective view of an inclinable plate in relation to an opening and closing pin shown in FIGS. 7 and 8; and, FIGS. 11 and 12 are sectional views similar to FIG. 9, according to two different embodiments of the present invention.
Figure 10:
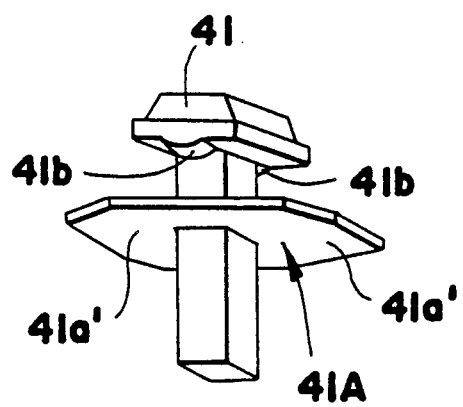

Namely, the drive arms 41a' which come into contact with a pair of operational arms 39a of the intermediate levers 39 are formed by a member separate from the opening and closing pin 41, as can be seen in FIGS. 9 and 10. The drive arms 41a' are provided on the opposite ends of the inclinable plate 41A through which the opening and closing pin 41 extends with a play. The opening and closing pin 41 has fulcrum projections 41b which are located at the center of the intermediate levers 39, so that the inclinable plate 41A can be inclined about the fulcrum projections 41b, relative to the opening and closing pin 41. The inclinable plate 41A is maintained at its initial position in which it lies perpendicularly to the axis of the opening and closing pin 41, by the pair of intermediate levers 39 located in a symmetrical arrangement, when no external force is applied to the inclinable plate 41A. The opening and closing pin 41 is radially projected most by the spring force of the wire spring 37 through the inclinable plate 41A.

Figure 7:
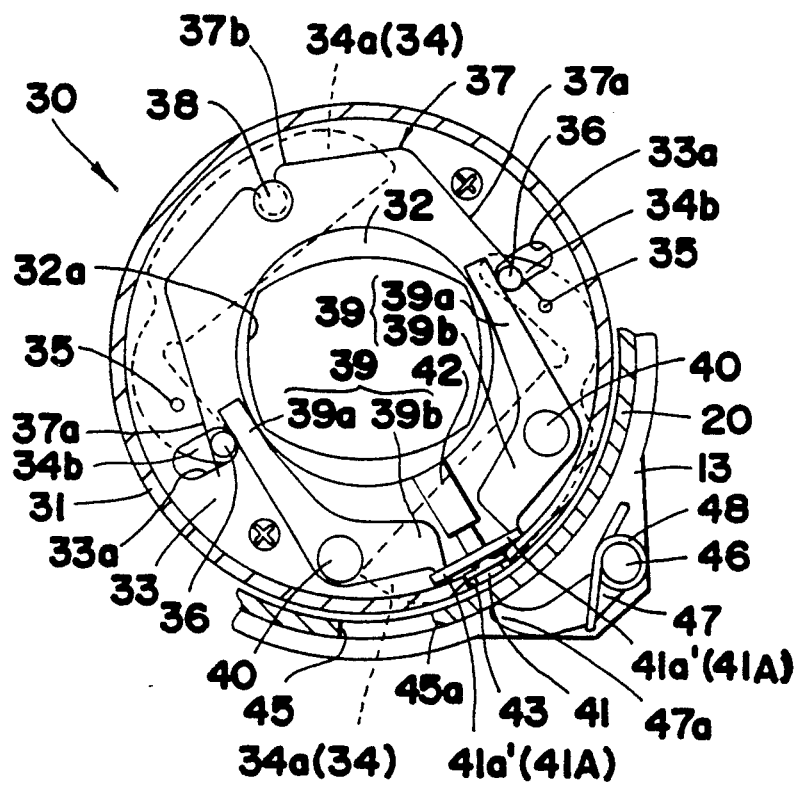
FIGS. 7 and 8 are sectional views similar to FIGS. 1 and 2, according to still another embodiment of the present invention, respectively.
Figure 8:
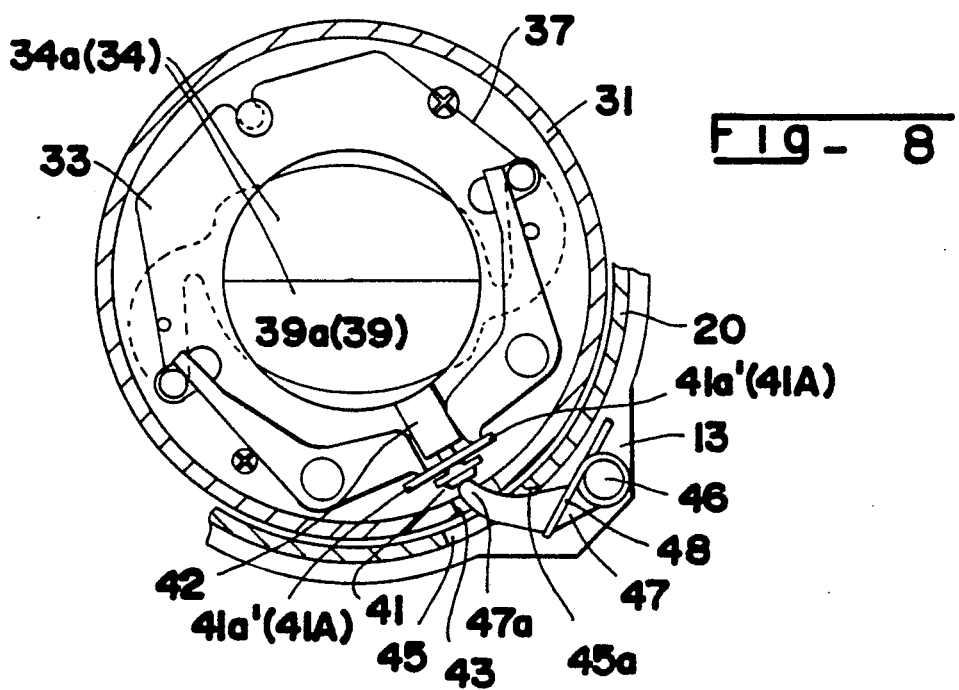

In the barrier mechanism 30 mentioned above, when the cam ring 20 is rotated to the photographing position in which a picture can be taken from one of the extremities of the angular displacement corresponding to the lens accommodating position, the closing lever 47 is rotated in the counterclockwise direction in FIGS. 7 and 8 against the torsion spring 48 by the end 45a of the opening 45, so that the operational end 47a of the closing lever 47 comes into slide contact with the outer peripheral surface of the cam ring 20. In this state, since no barrier closing force is applied to the opening and closing pin 41, the barriers 34 are opened by the spring force of the wire spring 37. In this position, the inclinable plate 41A lies in a plane perpendicular to the opening and closing pin 41 (FIG. 7).

After photographing ends, when the cam ring 20 is rotated to the lens accommodating position, the operational end 47a of the closing lever 47 enters the opening 45 of the cam ring 20 to project into the rectangular hole 43. As a result, the opening and closing pin 41 is pressed by the spring force of the torsion spring 48, so that the right and left drive arms 41a' of the inclinable plate 41A which is pressed through the fulcrum projections 41b press the driven arms 39b of the intermediate arms 39 to rotate the same against the spring force of the wire spring 37. Consequently, the pair of barriers 34 are rotated about the associated pins 35 to close the barrier plate portions 34a (FIG. 8).

If there is a difference in operational force of the drive arms 41a during the closure of the barriers, the inclinable plate 41A inclines (rotates) about the fulcrum projections 41b of the opening and closing pin 41 (FIG. 9). Namely, the drive arm 41a' (the left drive arm in FIG. 9) of the heavier barrier is pressed outward, so that the drive arm 41a' (the right drive arm in FIG. 9) of the lighter barrier is moved inward. In this state, if the opening and closing pin 41 is pushed inward, the lighter barrier 34 which is closed by the right intermediate lever 39 in FIG. 9 is first closed and is then stopped at an excess closed position beyond the correct closed position. A further displacement of the opening and closing pin 41 causes the inclinable plate 41A to move to correct the inclination relative to the opening and closing pin 41, thereby to press the intermediate lever 39 through the left drive arm 41a' in FIG. 9. As a result, the heavier barrier 34 is closed to come into contact with the lighter barrier 34 which has been excessively closed. Note that the lighter barrier can be easily moved by the heavier barrier, so that the pair of barriers 34 correctly close the aperture 32a.

Figure 11:
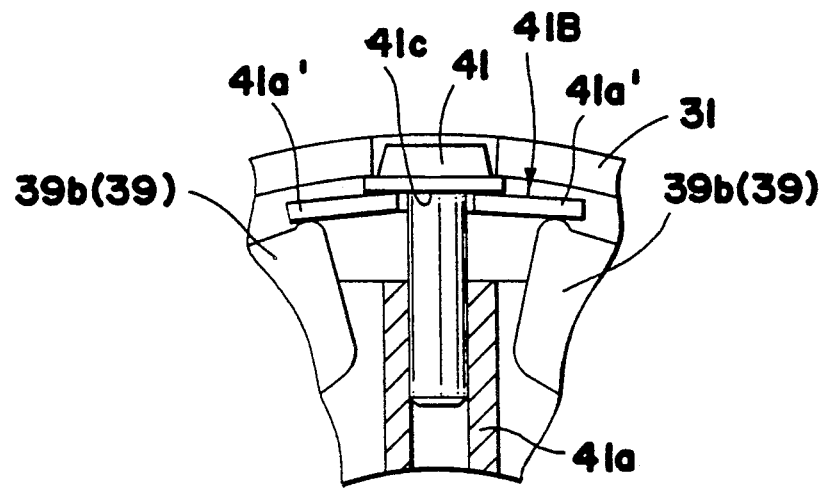
Figure 12:
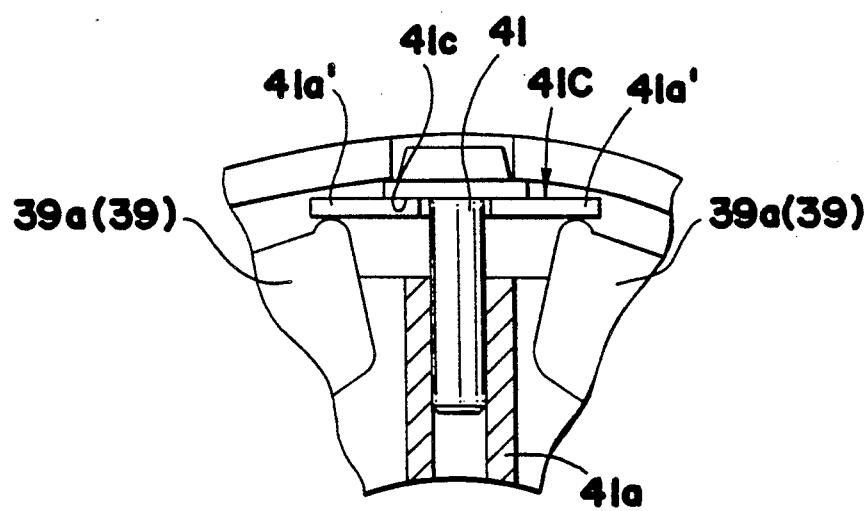

FIGS. 11 and 12 show two different embodiments of the present invention. In these modifications, no fulcrum projection 41b is provided on the opening and closing pin 41. In FIG. 11, the inclinable plate 41B has an archwise cross sectional shape, so that the apex portion (raised portion) thereof constitutes a fulcrum which comes into contact with the plane portion 41c of the opening and closing pin 41 to be inclined. In FIG. 12, the inclinable plate 41C is made of a flat plate which comes into contact with the plane portion 41d of the opening and closing pin 41.

According to the embodiment shown in FIG. 11, functional and technical advantages similar to those in FIGS. 7 and 8 can be obtained. In particular, the embodiment illustrated in FIG. 12 can be advantageously used when there is a large difference in load applied to the barriers.

Finally, it is possible to move the opening and closing pin 41 in the barrier closing direction by means other than the closing lever 47 biased by the spring. For instance, the opening and closing pin 41 can be moved to close the barriers by a part of the cam ring 20 or a closing member which is associated therewith.

We claim:

1. A barrier mechanism of a camera, comprising a cylindrical lens cover having a front end with an aperture therein, said barrier mechanism being supported to move between an open, photographing position and a closed, accommodating position, said cylindrical lens cover being provided with a cam ring which moves said cylindrical lens cover between said photographing position and said accommodating position in accordance with a rotation of said cam ring, at least two barriers which are provided on said front end of said cylindrical lens cover to open and close said aperture in said cylindrical lens cover, and a barrier opening and closing mechanism which opens and closes said barriers in association with said rotation of said cam ring, wherein said barrier opening and closing mechanism comprises spring means for biasing said barriers to said open position; an opening and closing pin which can be moved in radial directions of said cylindrical lens cover and which closes said barriers against said spring biasing means when said opening and closing pin moves in one radial direction; and a closing lever which is located at a predetermined position outside said cylindrical lens cover and which is biased to rotate and press said opening and closing pin to close said barriers, said cam ring being located to prevent said closing lever from contacting said opening and closing pin when said barriers are to be in said photographing position, means for permitting said closing lever to engage said opening and closing pin to close said barriers, without any radial force being exerted on said opening and closing pin by said cam ring, when said cylindrical lens cover is moved to said accommodating position, said means for permitting said closing lever to engage said opening and closing pin being associated with said cam ring.

2. The barrier mechanism of claim 1, further comprising a barrier ring plate having a front face, wherein said barriers are pivotable to said front face of said barrier ring plate.

3. The barrier mechanism of claim 1, wherein said spring means comprises a wire spring.

4. The barrier mechanism of claim 1, further comprising at least one intermediate lever which transmits the operation of said opening and closing pin to at least one of said barriers.

5. The barrier mechanism of claim 4, further comprising a barrier ring plate having a rear face, wherein each said intermediate lever is pivotable to said rear face of said barrier ring plate.

* * * * *

UNITED STATES PATENT AND TRADEMARK OFFICE
CERTIFICATE OF CORRECTION

PATENT NO. : 5,130,730
DATED : July 14, 1992
INVENTOR(S) : H. ISHII et al.

It is certified that error appears in the above-indentified patent and that said Letters Patent is hereby corrected as shown below:

On the title page, item: [73], Assignee, line 1, after "Kogyo" insert ---Kabushiki---.

Signed and Sealed this

Twenty-eighth Day of November 1995

Attest:

BRUCE LEHMAN

Attesting Officer

Commissioner of Patents and Trademarks